(12) United States Patent
Wang (10) Patent No.: US 11,685,286 B2
(45) Date of Patent: Jun. 27, 2023

(54) SYSTEMS AND METHODS FOR CHARGING MANAGEMENT OF CHARGING DEVICES

(71) Applicant: Noodoe Corporation, Taipei (TW)

(72) Inventor: John C. Wang, Taipei (TW)

(73) Assignee: NOODOE CORPORATION, Taipei (TW)

( * ) Notice: Subject to any disclaimer, the term of this patent is extended or adjusted under 35 U.S.C. 154(b) by 280 days.

(21) Appl. No.: 17/163,643

(22) Filed: Feb. 1, 2021

(65) Prior Publication Data
US 2021/0261015 A1 Aug. 26, 2021

(30) Foreign Application Priority Data
Feb. 21, 2020 (TW) .................................. 109105642

(51) Int. Cl.
*B60L 53/66* (2019.01)
*B60L 53/30* (2019.01)
*G06Q 50/06* (2012.01)

(52) U.S. Cl.
CPC ........... *B60L 53/665* (2019.02); *B60L 53/305* (2019.02); *G06Q 50/06* (2013.01)

(58) Field of Classification Search
CPC ...... B60L 53/665; B60L 53/305; G06Q 50/06

USPC .................................. 705/63, 412; 320/109
See application file for complete search history.

(56) References Cited

U.S. PATENT DOCUMENTS

| | | | |
|---|---|---|---|
| 9,889,759 B1 * | 2/2018 | Aswani | B60L 53/64 |
| 11,117,487 B2 * | 9/2021 | Al-Awami | B60L 53/62 |
| 2013/0046411 A1 * | 2/2013 | Al Faruque | H02J 3/322 |
| | | | 700/286 |

\* cited by examiner

*Primary Examiner* — Richard V Muralidar
(74) *Attorney, Agent, or Firm* — McClure, Qualey & Rodack, LLP (57) ABSTRACT

A computer-implemented charging management method is provided for controlling the charging schedule of an electric vehicle charging device. The power consumption for the electric vehicle charging device and the power consumption for a facility are cumulatively added to a same power meter for calculating utility bill during a billing period. First, the power consumption for the facility is monitored to obtained facility power consumption data. Time-variant electricity pricing data, specifying electricity price periods and respective electricity rates, applied to the power meter is also obtained. The charging schedule of the electric vehicle charging device is then controlled, according to the power consumption for the facility and the time-variant electricity pricing data, to perform charging process to at least one electric vehicle.

16 Claims, 8 Drawing Sheets

SYSTEMS AND METHODS FOR CHARGING MANAGEMENT OF CHARGING DEVICES

BACKGROUND OF THE INVENTION

Field of the Invention

The disclosure relates generally to charging management systems and methods thereof, and, more particularly to charging management systems and methods that can perform related managements for charging devices of electric vehicles.

Description of the Related Art

Recently, with the rising awareness of environmental protection and electric vehicle technology advances, the development of electric vehicles powered by electrical energy to replace traditional vehicles powered by fossil fuels has gradually become an important goal in the automotive field, thus making electric vehicles become more and more popular. In order to increase the range and willingness to use electric vehicles, many countries or cities have begun to set up charging stations in public places to provide electricity to electric vehicles, and have also begun to plan the deployment of a large number of charging stations in urban areas or scenic areas, so as to make the charging of electric vehicles more convenient. With the popularity of electric vehicles, more and more companies or factories use electric vehicles as transportation fleets.

On the other hand, in the electricity pricing (also referred to as electricity tariffs or the price of electricity) structure, part of the electricity pricing can be calculated according to the total power consumption in the billing period, and part of the electricity pricing can be calculated according to the highest power consumption per unit time in the billing period. When organizations, such as enterprises or factories that use non-domestic power meters, use electric vehicles as transportation fleets, if the fleet is parked in the parking lot of the enterprise or the factory for charging, the electricity used by the electric vehicle charging and the electricity used by the enterprise or the factory will be cumulatively added to the same power meter for calculating utility bill during the billing period. If the electric vehicle is charged at the same time in the period when the enterprise or factory uses more electricity, the electricity used by the electric vehicle charging will be superimposed with the electricity used by the enterprise or factory, such that the maximum power consumption in the billing period (that is, the maximum demand in the billing period) will be increased. In this way, in the billing period, the electricity charge of the power meter will be increased because of the highest power consumption in the billing period. As a result, enterprises or factories may incur high electricity charges due to the superposition of electric fleet charging and facility operation in the same period of time, resulting in a significant increase in operating costs. At the same time, for the society, because of the increase of the maximum demand in a specific period of time, the demand for the construction of power plants may be increased, and the social cost of electric vehicles may also be increased.

BRIEF SUMMARY OF THE INVENTION

Charging management systems and methods of charging devices are provided, which can manage the power output of the charging device of an electric vehicle, and can suppress the highest value of power consumption for a power meter in a billing period being pulled up due to the charging of the electric vehicles under a situation that the charging power consumption for the electric vehicle charging device and the facility power consumption for a facility are cumulatively added to the same power meter for calculating utility bill during the billing period, so as to avoid the high electricity charges caused by the superposition of the charging of electric fleets and the power consumption of facility operation at the same time period.

An embodiment of a charging management server for controlling a charging schedule of an electric vehicle charging device comprises a power consumption monitoring device and a processing device, wherein the power consumption for the electric vehicle charging device and the power consumption for a facility are cumulatively added to a same power meter for calculating utility bill during a billing period. The power consumption monitoring device is configured to monitor the power consumption for the facility to obtain facility power consumption data. The processing device is configured to obtain the facility power consumption data and time-variant electricity pricing data applied to the power meter and control the charging schedule of at least one electric vehicle by the electric vehicle charging device based on the facility power consumption data and the time-variant electricity pricing data.

In an embodiment of a charging management method executed by a computer device for controlling a charging schedule of an electric vehicle charging device, wherein the power consumption for the electric vehicle charging device and the power consumption for a facility are cumulatively added to a same power meter for calculating utility bill during a billing period, the power consumption for the facility is first monitored to obtain facility power consumption data. The facility power consumption data and time-variant electricity pricing data applied to the power meter are then obtained and the charging schedule of at least one electric vehicle by the electric vehicle charging device is controlled based on the facility power consumption data and the time-variant electricity pricing data.

In some embodiments, wherein the time-variant electricity pricing data includes electricity price periods and the corresponding electricity rate for each electricity price period in the billing period applied to the power meter.

In some embodiments, wherein the time-variant electricity pricing data includes peak electricity price periods and respective peak electricity rates and off-peak electricity price periods and respective off-peak electricity rates for use in the billing period applied to the power meter.

In some embodiments, the processing device further controls the electric vehicle charging device to give priority to perform the charging procedure to the electric vehicle in the electricity price period during which the electricity rate is lower.

In some embodiments, the facility power consumption data includes present power consumption for the facility and a historical power consumption record for the facility.

In some embodiments, the processing device further determines whether the present power consumption of the facility is higher than a first predetermined value, and controls the electric vehicle charging device to perform the charging procedure in the electricity price period during which the electricity rate in the time-variant electricity pricing data is lower when the present power consumption of the facility is higher than the first predetermined value.

In some embodiments, the processing device further determines whether the present power consumption of the facility is higher than a first predetermined value, and when the present power consumption of the facility is higher than the first predetermined, controls the electric vehicle charging device to start the charging procedure in the time period during which the facility power consumption in the historical power consumption record is lower than a second predetermined value according to the historical power consumption record.

In some embodiments, the first predetermined value and the second predetermined value are set according to the historical power consumption record of the facility.

In some embodiments, the processing device further obtains a charging request and corresponding vehicle-usage scheduling information and calculates a start time of the charging procedure corresponding to the charging request based on the facility power consumption data, the time-variant electricity pricing data, the charging request and the vehicle-usage scheduling information.

Charging management methods for controlling a charging schedule of an electric vehicle charging device may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Embodiments of the present invention provide charging management systems of charging devices and related charging management methods thereof, which can manage the power output of an electric vehicle charging device, and can suppress the highest value of power consumption for a power meter in a billing period being pulled up due to the charging of the electric vehicles under a situation that the charging power consumption for the electric vehicle charging device and the facility power consumption for a facility are cumulatively added to the same power meter for calculating utility bill during the billing period, so as to avoid the high electricity charges caused by the superposition of the charging of electric fleets and the power consumption of facility operation in the same time period. Moreover, with the charging management systems and related methods for charging management of charging devices of the invention, the situation of higher power demand caused by that the facility power consumption and the electric vehicle charging power consumption are concentrated in the same time period can be avoided, while suppressing the increase in power supply equipment and meeting the power demand of the electric vehicle charging device. On the other hand, with the present invention, because the power consumption time for the electric vehicle charging and the power consumption time for the facility are staggered as far as possible, the power consumption in the billing period can be distributed more evenly and the increasing of the high value of power demand caused by charging can be effectively reduced, thus reducing the use cost of electric vehicles and increasing the willingness to use related electric vehicles.

Figure 1:
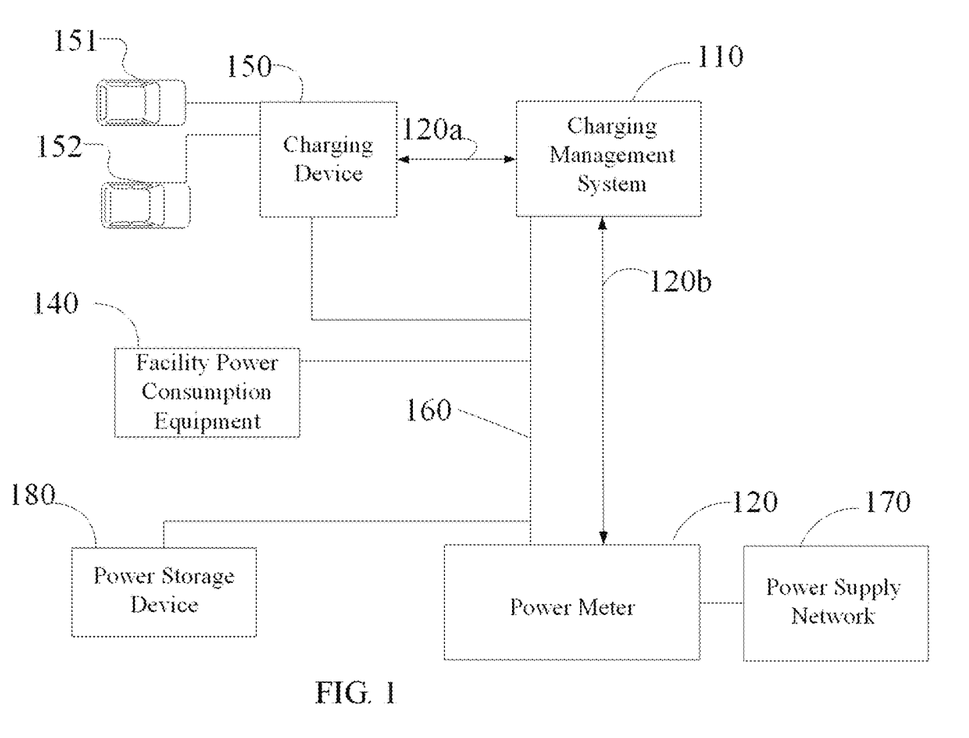
FIG. 1 is a schematic diagram illustrating an embodiment of an environment suitable for a charging management system of charging devices of the invention.

FIG. 1 is a schematic diagram illustrating an embodiment of an environment suitable for a charging management system of charging devices of the invention. As shown in FIG. 1, the charging management system 110 of charging devices of the present invention is connected to the charging device 150 through a communication line 120a, and is connected to the power meter 130 through the communication line 120b. In some embodiments, the charging management system 110 and the power meter 130 are informationally connected to each other in a wired manner, so that the charging management system 110 and the power meter 130 can also transmit information therebetween in an environment where there is no wireless network connection such as a telecommunication network or Wi-Fi network.

The charging management system 110, the facility power consumption equipment 140, and the charging device 150 are connected to the power meter 130 through the power supply line 160. The power meter 130 may measure and accumulate the power consumption of the charging management system 110, the facility power consumption equipment 140, and the charging device 150 in the electricity billing period to serve as a basis for calculating the electricity fee quota of the corresponding electricity consumption entity.

The charging management system 110 of the charging device obtains the facility power consumption data of the facility power consumption equipment 140 from the power meter 130 through the communication line 120b, and the facility power consumption data includes the present power consumption of the facility. The charging management system 110 may also store the facility power consumption data obtained in the past as the historical power consumption record of the facility.

The charging management system 110 may also obtain the power consumption information for the charging of the charging device 150 from the power meter 130 through the communication line 120b.

The charging device 150 is used to output electric power to power the electric vehicle 151 in response to a first charging request, wherein the first charging request includes a first vehicle-usage scheduling information, which may at least record the time when the electric vehicle 151 is scheduled to be used, a planned travel distance of the electric vehicle 151, the demand for the desired charging amount of the electric vehicle 151, and so on. Similarly, the charging device 150 is used to output electric power to charge the electric vehicle 152 in response to a second charging request, wherein the second charging request includes a second vehicle-usage scheduling information, which records the time when the electric vehicle 152 is scheduled to be used, a planned travel distance of the electric vehicle 152, the demand for the desired charging amount of the electric vehicle 152, and so on.

In some embodiments, the facility power consumption equipment 140 is being installed in a factory, and its power usage may vary with the operation time of the factory. The electric vehicles 151 and 152 charged by the charging device 150 are the transportation fleet of the factory, and their departure time, their charging time while staying in the parking lot, and their driving path have a certain degree of predictability.

The charging management system 110, the facility power consumption equipment 140, and the charging device 150 are connected to the power supply network 170 through the power supply line 160 and the power meter 130 to obtain power from the power supply network 170. The power consumption for the charging device 150 and the power consumption for the facility power consumption equipment 140 are cumulatively added to the power meter 130 for calculating utility bill during a billing period.

The charging management system 110, the facility power consumption equipment 140, and the charging device 150 are connected to a power storage device 180 through the power supply line 160 to obtain power from the power storage device 180. The power storage device 180 can be any power storage device, such as a power storage device that may store power generated by a solar panel, etc.

The electricity pricing method in the billing period is set by the power supply network 170, and different power supply network 170 may have different pricing methods and electricity pricing structures.

For example, in some embodiments, in the electricity pricing structure of the power supply network 170, some of the electricity pricing is calculated based on the total power consumption in the billing period, and some of the electricity pricing is calculated based on the highest power consumption in the billing period. The highest value of power consumption in the billing period is the highest value of power consumption per unit time in the billing period. The so-called power consumption per unit time can be freely set by the power supply network 170. For example, fifteen minutes can be set as a time unit, and the power consumption per fifteen minutes can be measured as the power consumption per unit time.

In some embodiments, in the electricity pricing structure of the power supply network 170, the time-variant electricity pricing data may be determined according to the power demand faced by the power supply network. For example, the time-variant electricity pricing data includes multiple electricity price periods and electricity rates corresponding thereto, such as peak electricity price period and off-peak electricity price period or peak electricity price period, mid-peak electricity price period and off-peak electricity price period, which are applicable to the power meter in the billing period. The electricity price set for the peak electricity price period is the highest, followed by the mid-peak electricity price period, and the off-peak electricity price period is the lowest.

Figure 8A:
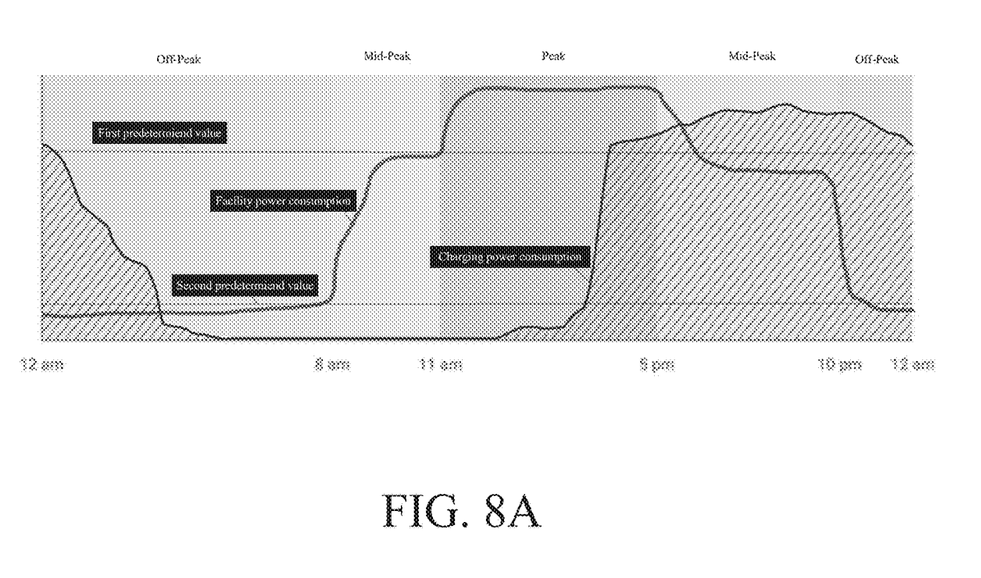
FIG. 8A is a schematic diagram illustrating an example showing the facility power consumption and charging power consumption when the charging management system of the present invention is not used.
Figure 8B:
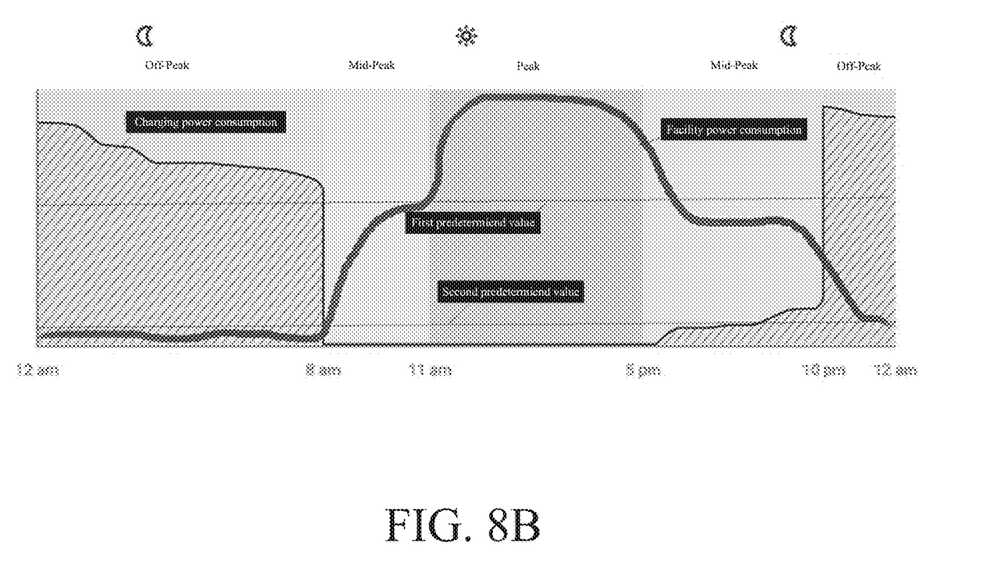
FIG. 8B is a schematic diagram illustrating an embodiment showing the facility power consumption and charging power consumption when the charging management system of the present invention is being used.

For example, FIG. 8A is a schematic diagram illustrating an example showing the facility power consumption and charging power consumption when the charging management system of the present invention is not used, and FIG. 8B is a schematic diagram illustrating an embodiment showing the facility power consumption and charging power consumption when the charging management system of the present invention is being used. In this embodiment, 11 a.m. to 5 p.m. belongs to peak electricity price period, 8 a.m. to 11 p.m. and 5 p.m. to 10 p.m. belong to mid-peak electricity price period, and 10 p.m. to 12 p.m. and 0 a.m. to 8 a.m. belong to off-peak electricity price period.

The charging management system 110 obtains time-variant electricity pricing data applicable to the power meter 130, and controls the charging schedule of the charging device 150 for the electric vehicle 151 and the electric vehicle 152 according to the power consumption information of the facility and the time-variant electricity pricing data to reduce the maximum demand of the power meter 130 in the charging billing period, so as to reduce the maximum demand without increasing the maximum demand as far as possible to complete the charging of the electric vehicle 151 and the electric vehicle 152 to meet the first and second vehicle-usage scheduling information. In some embodiments, the charging management system 110 may further control the charging device 150 to give priority to perform the charging procedure to charge the electric vehicle 151 and the electric vehicle 152 in the electricity price period during which the electricity rate is lower, so as to reduce the electricity charge of the power meter 130 in the billing period.

For example, in FIG. 8A, in the case of the charging management system of the invention is not used, vehicles are successively parked at the parking charging place and charged during the peak electricity price period. In this way, the electricity used for charging during the peak electricity price period is charged using the high electricity price applicable to the peak electricity price period, and because the facility power consumption is also concentrated in the peak electricity price period, it will also increase the maximum demand of the corresponding power meter in the electricity billing period.

In FIG. 8B, in the case of the charging management system of the invention is used, vehicles are successively parked at the parking charging place during the peak electricity price period, but charging is not started during the peak electricity price period, and charging is delayed until the off-peak electricity price period. In this way, the electricity used for charging in off-peak electricity price period is charged using the low electricity price applicable to off-peak electricity price period, and because the facility electricity usage and charging electricity usage are used separately, the maximum demand of the corresponding power meter in the electricity billing period will not be increased because of the charging of the electric vehicles.

In some embodiments, the charging management system 110 may further determine whether the present power consumption of the facility power consumption equipment 140 is higher than a first predetermined value. When the present power consumption of the facility power consumption equipment 140 is higher than the first predetermined value, it controls the charging device 150 to perform the charging procedure in the electricity price period during which the electricity rate in the time-variant electricity pricing data is lower.

For example, in FIG. 8B, in the case of using the charging management system of the present invention, vehicles are successively parked at the parking charging place during the peak electricity price period. However, because the present power consumption of the facilities at that time is higher than the first predetermined value, charging is not performed, but charging is delayed until the off-peak electricity price period after the power consumption of the facilities is reduced to the first predetermined value. In this way, in the off-peak period, the electricity used for charging is in the low electricity price applicable to off-peak period, and because the facility electricity usage and charging electricity usage are used separately, the maximum demand of the corresponding power meter in the billing period will not be increased due to the charging of electric vehicles.

In some embodiments, the charging management system 110 may further determine whether the present power consumption of the facility power consumption equipment 140 is higher than a first predetermined value. When the present power consumption of the facility power consumption equipment 140 is higher than the first predetermined value, it controls the charging device 150 to start the charging procedure in the time period during which the facility power consumption in the historical power consumption record is lower than a second predetermined value according to the historical power consumption record.

For example, in FIG. 8B, in the case of using the charging management system of the present invention, vehicles are successively parked at the parking charging place during the peak electricity price period. However, because the present power consumption of the facilities at that time is higher than the first predetermined value, charging is not performed, but charging is delayed until the off-peak electricity price period after the power consumption of the facilities is reduced to the second predetermined value. In this way, because the facility electricity usage and charging electricity usage are used separately, the maximum demand of the corresponding power meter in the billing period will not be increased due to the charging of electric vehicles. It is noted that the first and second predetermined values can be determined according to the historical power consumption records.

The charging management system 110 may further determine whether the present power consumption of the facility power consumption equipment 140 is higher than a first predetermined value. When the present power consumption of the facility power consumption equipment 140 is higher than the first predetermined value, it controls the power storage device 180 to provide power for use. The power provided by the power storage device 180 will not be included in the accumulated power consumption measured by the power meter 130.

Figure 2:
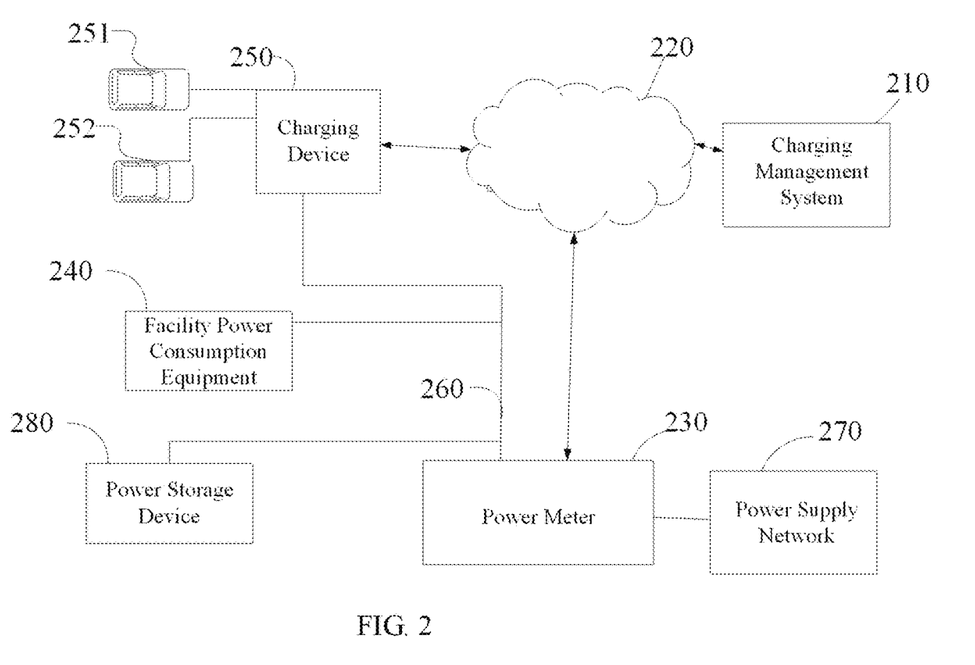
FIG. 2 is a schematic diagram illustrating another embodiment of an environment suitable for a charging management system of charging devices of the invention.

FIG. 2 is a schematic diagram illustrating another embodiment of an environment suitable for a charging management system of charging devices of the invention. As shown in FIG. 2, a charging management system 210 of charging devices of the present invention is connected to the power meter 230 and the charging device 250 through a communication network 220. In some embodiments, the charging management system 210 can be a cloud computing device similar to a cloud server, which is connected to the power meter 230 and the charging device 250 through a communication network such as the Internet.

The facility power consumption equipment 240 and the charging device 250 are connected to the power meter 230 through the power supply line 260.

The charging management system 210 of charging devices may obtain the facility power consumption data of the facility power consumption equipment 240 from the power meter 230 through the communication network 220, wherein the facility power consumption data includes the present power consumption of the facility and the historical power consumption records. The charging management system 210 may also store the facility power consumption data obtained in the past as the historical power consumption record of the facility.

The charging management system 210 may also obtain the power consumption information for the charging of the charging device 250 from the power meter 130 through the communication network 220.

The charging device 250 is used to output electric power to power the electric vehicle 251 in response to a first charging request, wherein the first charging request includes a first vehicle-usage scheduling information, which may at least record the time when the electric vehicle 251 is scheduled to be used, a planned travel distance of the electric vehicle 251, the demand for the desired charging amount of the electric vehicle 251, and so on. Similarly, the charging device 250 is used to output electric power to charge the electric vehicle 252 in response to a second charging request, wherein the second charging request includes a second vehicle-usage scheduling information, which records the time when the electric vehicle 252 is scheduled to be used, a planned travel distance of the electric vehicle 252, the demand for the desired charging amount of the electric vehicle 252, and so on.

In some embodiments, the facility power consumption equipment 240 is being installed in a factory, and its power usage may vary with the operation time of the factory. The electric vehicles 251 and 252 charged by the charging device 150 are the transportation fleet of the factory, and their departure time, their charging time while staying in the parking lot, and their driving path have a certain degree of predictability.

The facility power consumption equipment 240 and the charging device 250 are connected to the power supply network 270 through the power supply line 260 and the power meter 230 to obtain power from the power supply network 270. The power consumption for the charging device 250 and the power consumption for the facility power consumption equipment 240 are cumulatively added to the power meter 230 for calculating utility bill during a billing period. The charging management system 210 can be a cloud computing device set at the far end. Its power can be supplied from the power supply network 270 or from other power sources. Therefore, the charging management system 210 does not need to connect with the power meter 230 through the power supply line 260. The charging management system 210 obtains information from the power meter 230, but does not use electricity.

The facility power consumption equipment 240 and the charging device 250 are connected to a power storage device 280 through the power supply line 260 to obtain power from the power storage device 280. The power storage device 280 can be any power storage device, such as a power storage device that may store power generated by a solar panel, etc.

The electricity pricing method in the billing period is set by the power supply network 270, and different power supply network 270 will have different pricing methods and electricity pricing structure.

For example, in some embodiments, in the electricity pricing structure of the power supply network 270, some of the electricity pricing is calculated based on the total power consumption in the billing period, and some of the electricity pricing is calculated based on the highest power consumption in the billing period. The highest value of power consumption in the billing period is the highest value of power consumption per unit time in the billing period. The so-called power consumption per unit time can be freely set by the power supply network 270. For example, fifteen minutes can be set as a time unit, and the power consumption per fifteen minutes can be measured as the power consumption per unit time.

In some embodiments, in the electricity pricing structure of the power supply network 270, the time-variant electricity pricing data may be set according to the tight degree of power consumption. For example, the time-variant electricity pricing data includes electricity price periods and electricity rates corresponding thereto, such as peak electricity price period and off-peak electricity price period or peak electricity price period, mid-peak electricity price period and off-peak electricity price period, which are applicable to the power meter in the billing period. The electricity price set for the peak electricity price period is the highest, followed by the mid-peak electricity price period, and the off-peak electricity price period is the lowest.

The charging management system 210 obtains time-variant electricity pricing data applicable to the power meter 230, and controls the charging schedule of the charging device 250 for the electric vehicle 251 and the electric vehicle 252 according to the power consumption information of the facility and the time-variant electricity pricing data to reduce the maximum demand of the power meter 230 in the charging billing period, so as to reduce the maximum demand without increasing the maximum demand as far as possible to complete the charging of the electric vehicle 251 and the electric vehicle 252 to meet the first and second vehicle-usage scheduling information. In some embodiments, the charging management system 210 may further control the charging device 250 to give priority to perform the charging procedure to charge the electric vehicle 251 and the electric vehicle 252 in the electricity price period during which the electricity rate is lower, so as to reduce the electricity charge of the power meter 230 in the billing period.

In some embodiments, the charging management system 210 may further determine whether the present power consumption of the facility power consumption equipment 240 is higher than a first predetermined value. When the present power consumption of the facility power consumption equipment 240 is higher than the first predetermined value, it controls the charging device 250 to perform the charging procedure in the electricity price period during which the electricity rate in the time-variant electricity pricing data is lower.

In some embodiments, the charging management system 210 may further determine whether the present power consumption of the facility power consumption equipment 240 is higher than a first predetermined value. When the present power consumption of the facility power consumption equipment 240 is higher than the first predetermined value, it controls the charging device 250 to start the charging procedure in the time period during which the facility power consumption in the historical power consumption record is lower than a second predetermined value according to the historical power consumption record.

The charging management system 210 may further determine whether the present power consumption of the facility power consumption equipment 240 is higher than a first predetermined value. When the present power consumption of the facility power consumption equipment 240 is higher than the first predetermined value, it controls the power storage device 280 to provide power for use. The power provided by the power storage device 280 will not be included in the accumulated power consumption measured by the power meter 230.

The main difference between the charging management system 210 in FIG. 2 and the charging management system 110 in FIG. 1 is that it is a cloud device, and the effect it can achieved can also be seen in FIGS. 8A and 8B.

Figure 3:
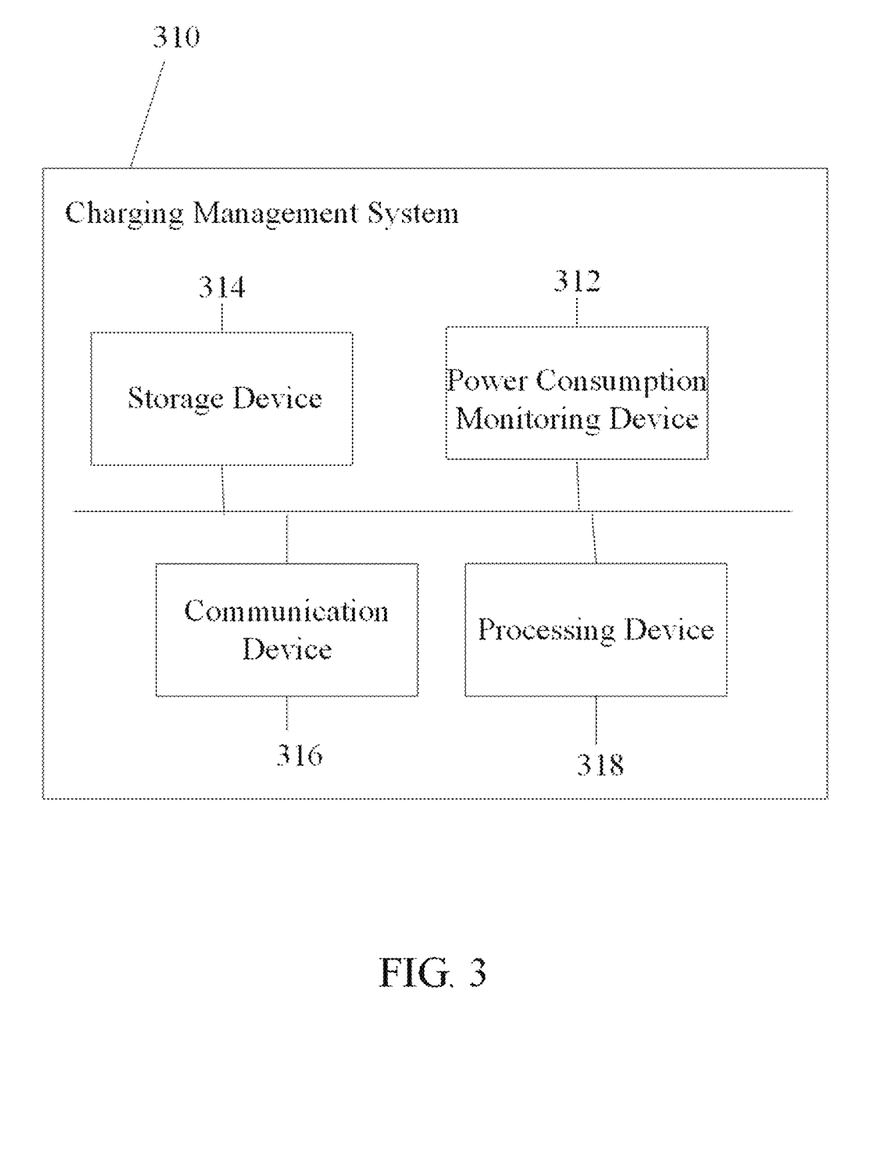
FIG. 3 is a schematic diagram illustrating an embodiment of a charging management system of the invention.

FIG. 3 is a schematic diagram illustrating an embodiment of a charging management system of charging devices of the invention. As shown in FIG. 3, the charging management system 310 of charging devices of the present invention can be applied to manage charging devices set in facilities such as factories, and can suppress the highest value of power consumption for the power meter in a billing period being pulled up due to the charging of the electric vehicles under a situation that the charging power consumption for the electric vehicle charging device and the power consumption for a facility are cumulatively added to the same power meter for calculating utility bill during the billing period, so as to avoid the high electricity charges caused by the superposition of the charging of electric fleets and the power consumption of facility operation in the same time period. The charging management system 310 can be used in the environment as shown in FIG. 1 or FIG. 2. It can be a local device or a cloud device. It can be connected with the power meter and the charging device of the facility through wired or wireless communication lines. The charging management system 310 has the processing capability to perform charging management of charging devices, and has the network connection function to receive, download or update various parameters and information required by the charging management operation.

The charging management system 310 may comprise at least a power consumption monitoring device 312, a storage device 314, a communication device 316 and a processing device 318. The charging management system 310 is suitable for controlling the charging schedule of an electric vehicle charging device, in which the power consumption for the charging of the electric vehicle charging device and the power consumption for a facility are cumulatively added to the same power meter for calculating utility bill during the same billing period.

The communication device 316 can receive, download or update various parameters and information required for charging management operation through a communication line or network, such as a wired network, a telecommunication network, and a wireless network, such as a Wi-Fi network or the like.

The power consumption monitoring device 312 can monitor the power consumption of the facility to obtain the power consumption information of the facility. For example, the power consumption monitoring device 312 may obtain the power consumption information of the facility corresponding to the facility power consumption equipment of a specific power consumption entity from the power meter through the communication device 316. The power consumption information of the facility may include present power consumption of the facility. The received present power consumption is recorded in the storage device 314 as the historical power consumption record of the facility. The power consumption monitoring device 312 can also obtain the power consumption information for the charging of the charging device corresponding to the specific power consumption entity from the power meter through the communication device 316.

The storage device 314 (for example, a memory or a database) can store and record related data, such as charging equipment information, power supply information corresponding to power supply equipment, historical power consumption records of facilities, etc. It is noted that, above data is merely examples of the application, and the present invention is not limited thereto.

The processing device 318 can control related operations of software and hardware in the charging management system 310 to perform the charging management method of charging devices of the invention, the details of which will be described later. For example, the processing device 318 can be a general-purpose controller, a micro-control unit (MCU), a digital signal processor (DSP), or the like, which provides the function of data analyzing, processing, and computing. However, it is understood that the present invention is not limited thereto.

Figure 4:
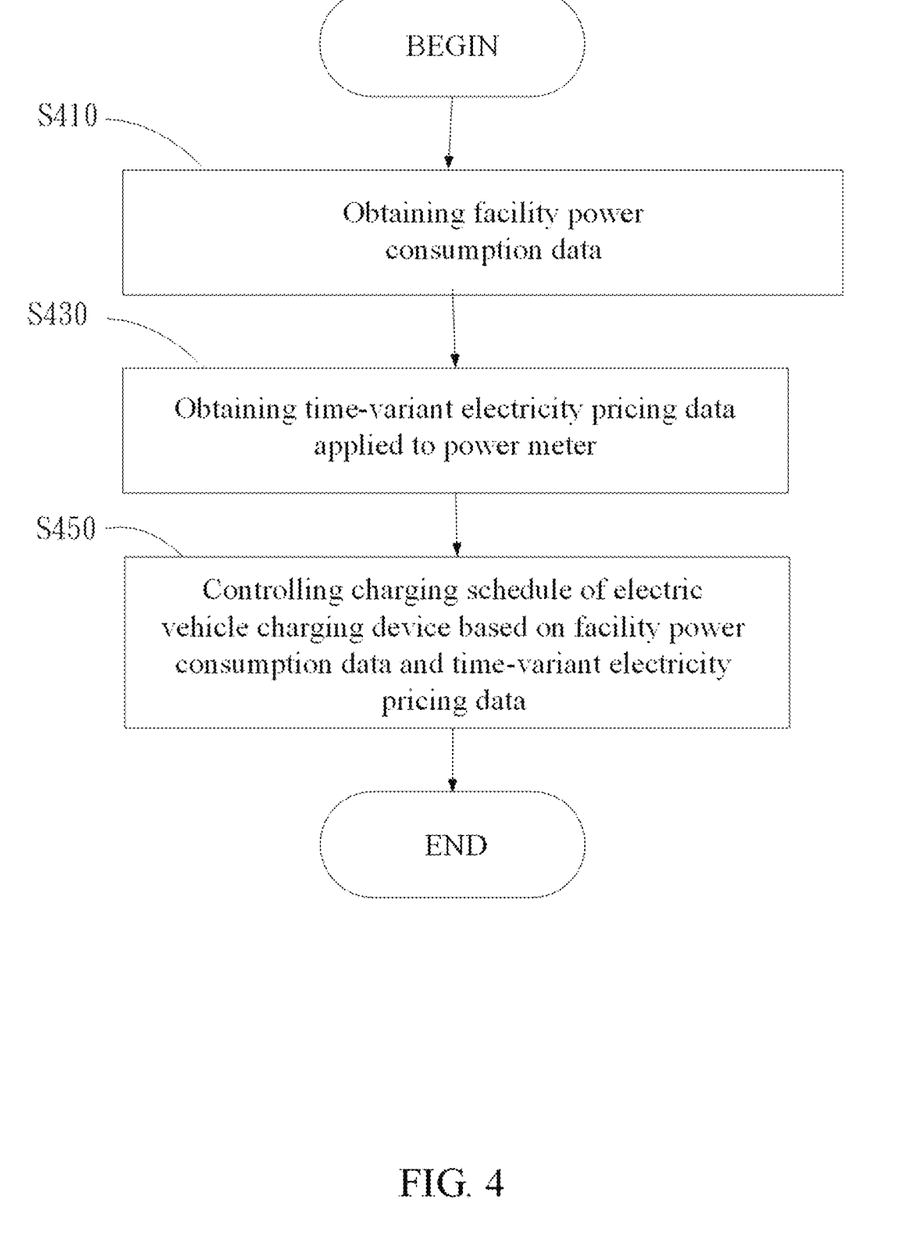
FIG. 4 is a flowchart of an embodiment of a charging management method of charging devices of the invention.

FIG. 4 is a flowchart of an embodiment of a charging management method of charging devices of the invention. The charging management method of charging devices of the invention in this embodiment can be applied to the charging management system 310 of FIG. 3 and performed by the processing device 318 of the charging management system 310.

First, in step S410, facility power consumption data is obtained, wherein the facility power consumption data can be obtained in any way, for example, from a power meter through a wired or wireless network.

In step S430, time-variant electricity pricing data applied to the power meter are then obtained. The time-variant electricity pricing data includes electricity price periods and electricity rates corresponding thereto, such as peak electricity price periods and respective peak electricity rates and off-peak electricity price periods and respective off-peak electricity rates for use in the billing period applied to the power meter.

In step S450, the charging schedule of at least one electric vehicle by the electric vehicle charging device is controlled based on the facility power consumption data and the time-variant electricity pricing data.

In some embodiments, the method further controls the electric vehicle charging device to prioritize the charging procedure for the electric vehicle during the electricity price period when the electricity price is lower.

Figure 5:
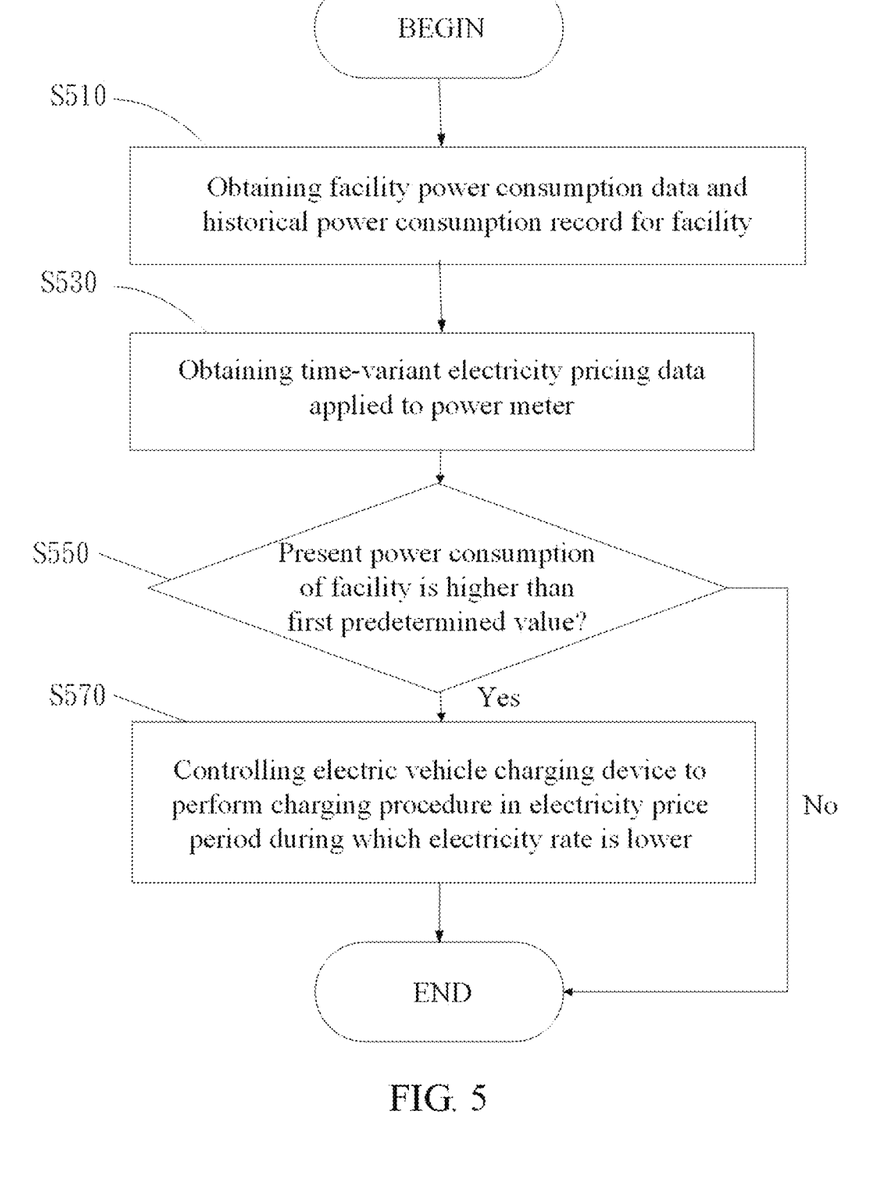
FIG. 5 is a flowchart of another embodiment of a charging management method of charging devices of the invention.

FIG. 5 is a flowchart of another embodiment of a charging management method for of charging devices of the invention. The charging management method of charging devices of the invention in this embodiment can be applied to the charging management system 310 of FIG. 3 and performed by the processing device 318 of the charging management system 310.

First, in step S510, facility power consumption data and historical power consumption record of the facility are obtained, which can be obtained in any way, for example, from a power meter through a wired or wireless network to obtain the facility power consumption data, or from facility power consumption data that have been received in the past retrieved from the storage device to be the historical power consumption record of the facility.

In step S530, time-variant electricity pricing data applied to the power meter are then obtained. The time-variant electricity pricing data includes electricity price periods and electricity rates corresponding thereto, such as peak electricity price periods and respective peak electricity rates and off-peak electricity price periods and respective off-peak electricity rates for use in the billing period applied to the power meter.

In step S550, it is determined whether present power consumption of the facility is higher than a first predetermined value. When it is determined that the present power consumption of the facility is higher than the first predetermined value, step S570 is further performed.

In step S570, the electric vehicle charging device is controlled to perform the charging procedure in the electricity price period during which the electricity rate in the time-variant electricity pricing data is lower when the present power consumption of the facility is higher than the first predetermined value.

Figure 6:
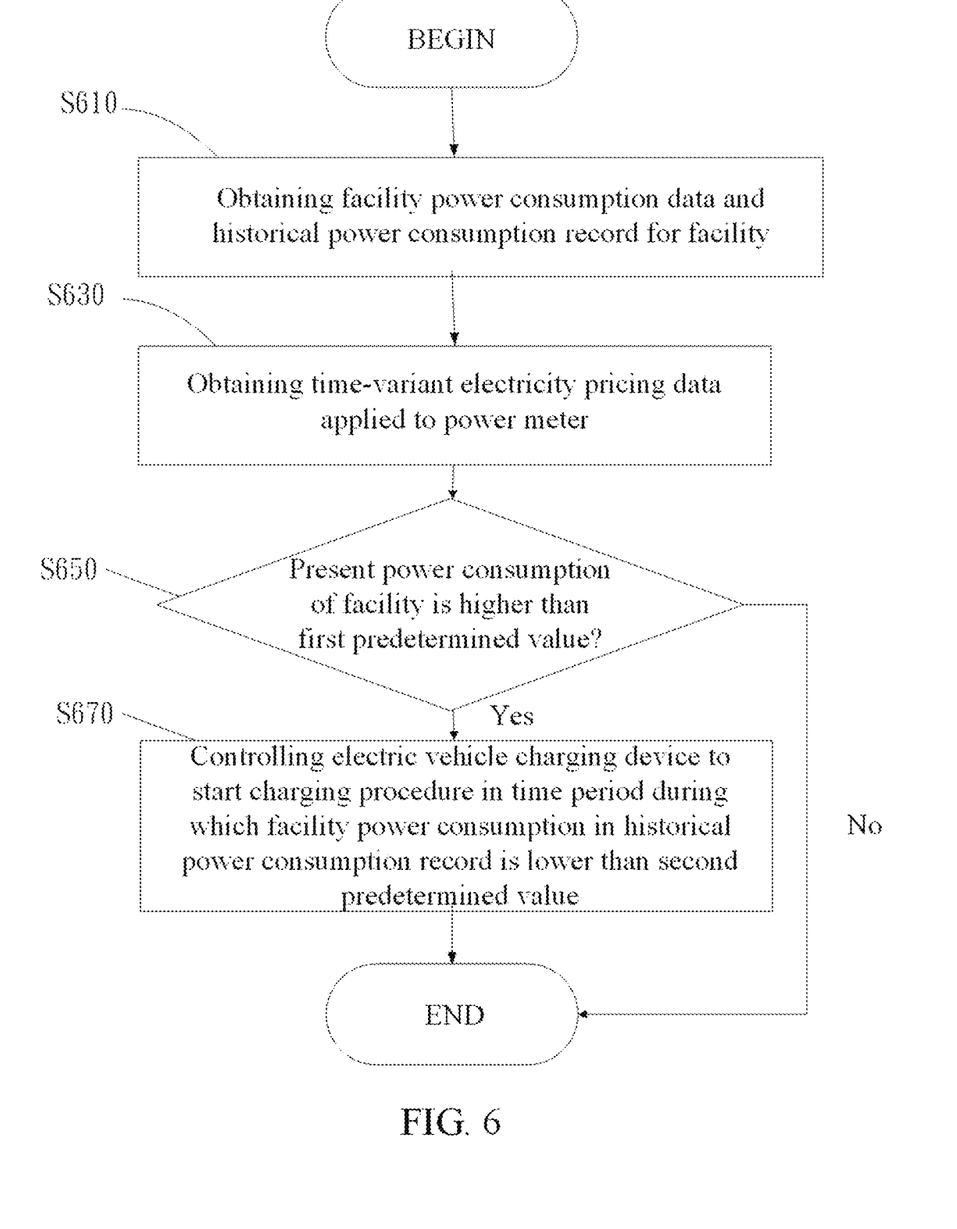
FIG. 6 is a flowchart of another embodiment of a charging management method of charging devices of the invention.

FIG. 6 is a flowchart of another embodiment of a charging management method for of charging devices of the invention. The charging management method of charging devices of the invention in this embodiment can be applied to the charging management system 310 of FIG. 3 and performed by the processing device 318 of the charging management system 310.

First, in step S610, facility power consumption data and historical power consumption record of the facility are obtained, which can be obtained in any way, for example, from a power meter through a wired or wireless network to obtain the facility power consumption data, or from facility power consumption data that have been received in the past retrieved from the storage device to be the historical power consumption record of the facility.

In step S630, time-variant electricity pricing data applied to the power meter are then obtained. The time-variant electricity pricing data includes electricity price periods and electricity rates corresponding thereto, such as peak electricity price periods and respective peak electricity rates and off-peak electricity price periods and respective off-peak electricity rates for use in the billing period applied to the power meter.

In step S650, it is determined whether present power consumption of the facility is higher than a first predetermined value. When it is determined that the present power consumption of the facility is higher than the first predetermined value, step S670 is further performed.

In step S670, the electric vehicle charging device is controlled to start the charging procedure in the time period during which the facility power consumption in the historical power consumption record is lower than a second predetermined value according to the historical power consumption record.

Figure 7:
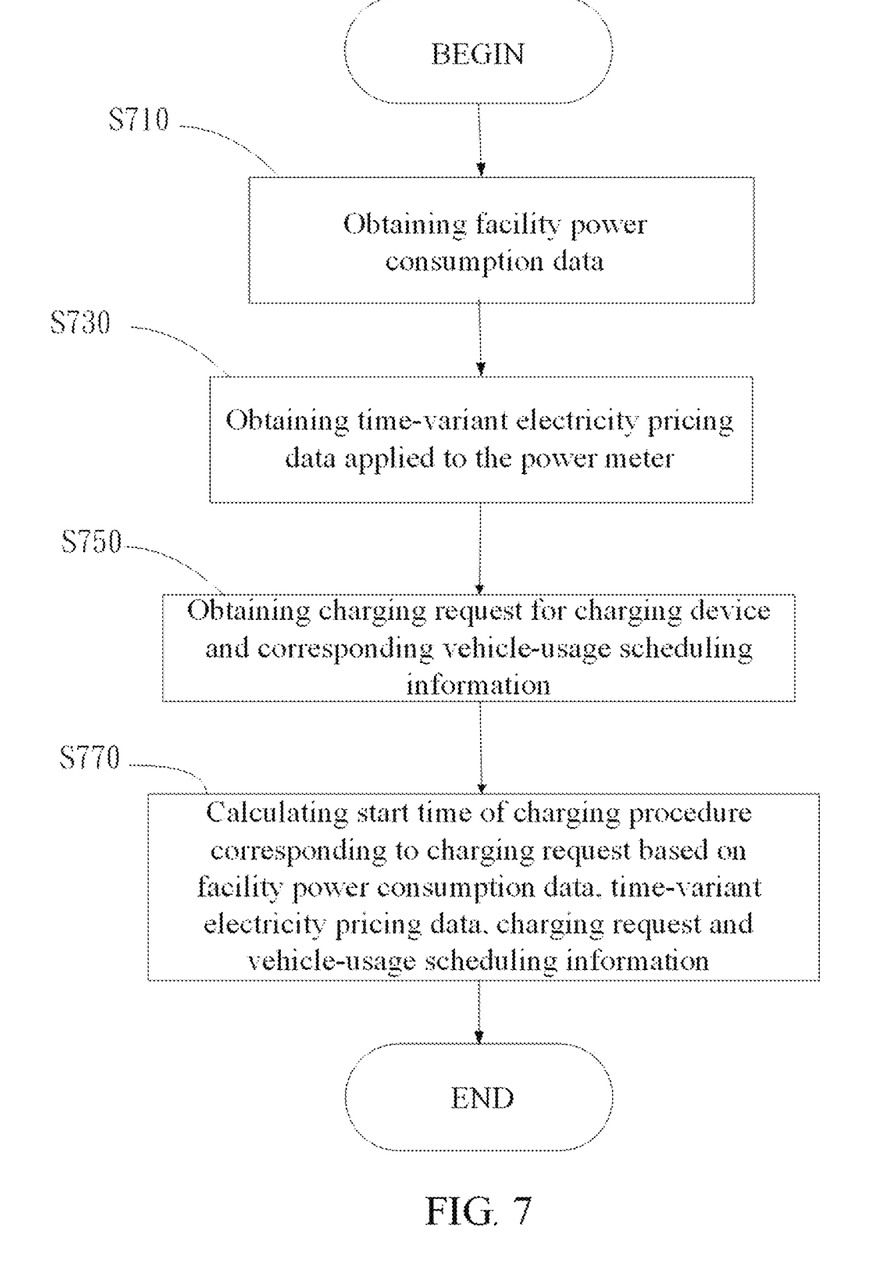
FIG. 7 is a flowchart of another embodiment of a charging management method of charging devices of the invention.

FIG. 7 is a flowchart of another embodiment of a charging management method for of charging devices of the invention. The charging management method of charging devices of the invention in this embodiment can be applied to the charging management system 310 of FIG. 3 and performed by the processing device 318 of the charging management system 310.

First, in step S710, facility power consumption data is obtained, wherein the facility power consumption data can be obtained in any way, for example, from a power meter through a wired or wireless network.

In step S730, time-variant electricity pricing data applied to the power meter are then obtained. The time-variant electricity pricing data includes electricity price periods and electricity rates corresponding thereto, such as peak electricity price periods and respective peak electricity rates and off-peak electricity price periods and respective off-peak electricity rates for use in the billing period applied to the power meter.

In step S750, a charging request for the charging device and respective vehicle-usage scheduling information are obtained.

In step S770, the starting time of the charging procedure corresponding to the charging request is calculated according to the facility power consumption data, the time-variant electricity pricing data, the charging request and the vehicle-usage scheduling information. If it is necessary to charge the electric vehicle during the peak electricity price period, a power storage device can also be controlled to provide power for the charging device.

Therefore, the charging management systems and charging management methods of the present invention can manage the power output of an electric vehicle charging device, and can suppress the highest value of power consumption for a power meter in a billing period being pulled up due to the charging of the electric vehicles under a situation that the charging power consumption for the electric vehicle charging device and the facility power consumption for a facility are cumulatively added to the same power meter for calculating utility bill during the billing period, so as to avoid the high electricity charges caused by the superposition of the charging of electric fleets and the power consumption of facility operation in the same time period. Moreover, with the present invention, the existing power supply equipment can be used flexibly to avoid the addition of new power supply equipment and the situation of higher power demand caused by that the facility power consumption and electric vehicle charging power consumption are concentrated in the same time period can be avoided, while suppressing the increase in equipment cost and meeting the power demand of the electric vehicle charging device. On the other hand, with the present invention, because the electric vehicle charging power consumption time and facility power consumption time are staggered as far as possible, the power consumption in the billing period can be distributed more evenly and the increasing of the high value of power demand caused by charging can be effectively reduced, thus reducing the use cost of electric vehicles and increasing the willingness to use related electric vehicles.

Charging management methods, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A charging management system for controlling a charging schedule of an electric vehicle charging device, wherein the power consumption for the electric vehicle charging device and the power consumption for a facility are cumulatively added to a same power meter for calculating utility bill during a billing period, comprising:
   a power consumption monitoring device configured to monitor the power consumption for the facility to obtain facility power consumption data; and
   a processing device configured to obtain the facility power consumption data and time-variant electricity pricing data applied to the power meter and control the charging schedule of at least one electric vehicle by the electric vehicle charging device based on the facility power consumption data and the time-variant electricity pricing data,
   wherein the facility power consumption data includes present power consumption for the facility and a historical power consumption record for the facility, and wherein the processing device further determines whether the present power consumption of the facility is higher than a first predetermined value, and controls the electric vehicle charging device to perform the charging procedure in the electricity price period during which the electricity rate in the time-variant electricity pricing data is lower when the present power consumption of the facility is higher than the first predetermined value.

2. The charging management system of claim 1, wherein the time-variant electricity pricing data includes electricity price periods and the corresponding electricity rate for each electricity price period in the billing period applied to the power meter.

3. The charging management system of claim 2, wherein the time-variant electricity pricing data includes peak electricity price periods and respective peak electricity rates and off-peak electricity price periods and respective off-peak electricity rates for use in the billing period applied to the power meter.

4. The charging management system of claim 2, wherein the processing device further controls the electric vehicle charging device to give priority to perform the charging procedure to the electric vehicle in the electricity price period during which the electricity rate is lower.

5. The charging management system of claim 1, wherein the first predetermined value and the second predetermined value are set according to the historical power consumption record of the facility.

6. The charging management system of claim 1, wherein the processing device further determines whether the present power consumption of the facility is higher than the first predetermined value, and when the present power consumption of the facility is higher than the first predetermined value, controls the electric vehicle charging device to start the charging procedure in the time period during which the facility power consumption in the historical power consumption record is lower than a second predetermined value according to the historical power consumption record.

7. The charging management system of claim 6, wherein the first predetermined value and the second predetermined value are set according to the historical power consumption record of the facility.

8. The charging management system of claim 1, wherein the processing device further obtains a charging request and corresponding vehicle-usage scheduling information and calculates a start time of the charging procedure corresponding to the charging request based on the facility power consumption data, the time-variant electricity pricing data, the charging request and the vehicle-usage scheduling information.

9. A charging management method executed by a computer device for controlling a charging schedule of an electric vehicle charging device, wherein the power consumption for the electric vehicle charging device and the power consumption for a facility are cumulatively added to a same power meter for calculating utility bill during a billing period, the method comprising:
monitoring the power consumption for the facility to obtain facility power consumption data; and
obtaining the facility power consumption data and time-variant electricity pricing data applied to the power meter and controlling the charging schedule of at least one electric vehicle by the electric vehicle charging device based on the facility power consumption data and the time-variant electricity pricing data,
wherein the facility power consumption data includes present power consumption for the facility and a historical power consumption record for the facility, and the method further comprises determining whether the present power consumption of the facility is higher than a first predetermined value, and when the present power consumption of the facility is higher than the first predetermined value, controlling the electric vehicle charging device to start the charging procedure in the time period during which the facility power consumption in the historical power consumption record is lower than a second predetermined value according to the historical power consumption record.

10. The charging management method of claim 9, wherein the time-variant electricity pricing data includes electricity price periods and the corresponding electricity rate for each electricity price period for use in the billing period applied to the power meter.

11. The charging management method of claim 10, wherein the time-variant electricity pricing data includes peak electricity price periods and respective peak electricity rates and off-peak electricity price periods and respective off-peak electricity rates for use in the billing period applied to the power meter.

12. The charging management method of claim 10, further comprising:
controlling the electric vehicle charging device to give priority to perform the charging procedure to the electric vehicle in the electricity price period during which the electricity rate is lower.

13. The charging management method of claim 9, further comprising:
determining whether the present power consumption of the facility is higher than the first predetermined value, and controlling the electric vehicle charging device to perform the charging procedure in the electricity price period during which the electricity rate in the time-variant electricity pricing data is lower when the present power consumption of the facility is higher than the first predetermined value.

14. The charging management method of claim 13, wherein the first predetermined value and the second predetermined value are set according to the historical power consumption record of the facility.

15. The charging management method of claim 9, wherein the first predetermined value and the second predetermined value are set according to the historical power consumption record of the facility.

16. The charging management method of claim 9, further comprising:
obtaining a charging request and corresponding vehicle-usage scheduling information and calculating a start time of the charging procedure corresponding to the charging request based on the facility power consumption data, the time-variant electricity pricing data, the charging request and the vehicle-usage scheduling information.

\* \* \* \* \*